United States Patent Office 3,036,078
Patented May 22, 1962

3,036,078
WATER-SOLUBLE SALTS OF ANTHRAQUINONE DYESTUFFS
Paul Grossmann, Binningen, and Paul Rhyner, Basel, Switzerland, assignors to Ciba Limited, Basel, Switzerland
No Drawing. Filed Dec. 21, 1959, Ser. No. 860,630
Claims priority, application Switzerland Dec. 24, 1958
6 Claims. (Cl. 260—272)

This invention provides valuable water-soluble salts of anthraquinone dyestuffs, which contain a single anthraquinone nucleus, are free from acid groups imparting solubility in water, and contain at least one radical of the formula (1) 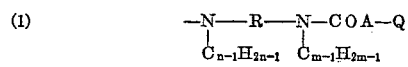

in which R represents an aliphatic or aromatic radical, A represents an aliphatic or araliphatic radical, Q represents a quaternary ammonium group, and $m$ and $n$ each represents a whole number not greater than 8.

The new dyestuffs advantageously contain one or two radicals of the formula

2) 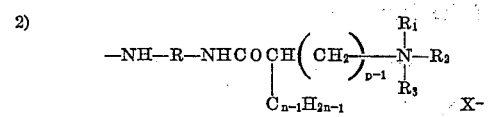

in which R represents an alkylene or phenylene radical, $R_1$ represents a hydrogen atom or an alkyl radical, $R_2$ and $R_3$ each represent an alkyl, cycloalkyl or aralkyl radical, or two of the radicals $R_1$, $R_2$ and $R_3$ together with the nitrogen atom form a heterocyclic ring system, X represents an anion, $p$ is the whole number 1 or 2, and $n$ is a whole number not greater than 8.

The invention also provides a process for the manufacture of the aforesaid water-soluble salts of anthraquinone dyestuffs, wherein an anthraquinone derivative, which contains a single anthraquinone nucleus, is free from acid groups imparting solubility in water and contains at least one radical of the formula (3) 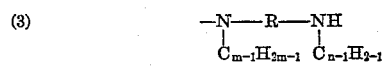

in which R represents an aliphatic or aromatic radical, and $m$ and $n$ each represents a whole number not greater than 8 is acylated with a halide of an aliphatic monocarboxylic acid with contains (a) a mobile halogen atom or (b) a quaternary ammonium group, and, when the acylation product so obtained contains a mobile halogen atom (a) the product is condensed with a secondary or tertiary amine and, if desired, the resulting condensation product may be treated with an alkylating agent.

The anthraquinone derivatives used as starting materials advantageously contain the radical or radicals of the Formula 1 in α-position. In addition to the aforesaid radicals further substituents may be present in the anthraquinone nucleus, advantageously also in α-position, for example, a halogen atom or a hydroxyl, alkoxy, amino, alkylamino, arylamino or acylamino group. Of special interest are compounds of the formula (4) 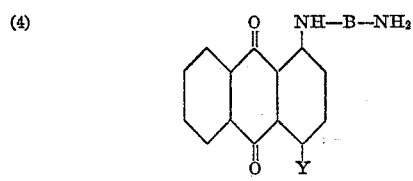

in which B represents a phenylene radical, and Y represents a hydrogen atom or one of the substituents mentioned above. As examples of anthraquinone derivatives there may be mentioned:

1-(p-aminophenylamino)-anthraquinone,
1-(m-aminophenylamino)-anthraquinone,
1:4-, 1:5- or 1:8-di-(m- or p-aminophenylamino)-anthraquinone,
1-(β-aminoethylamino)-anthraquinone,
1:4- or 1:5-di-(β-aminoethylamino)-anthraquinone,
1-(γ-aminopropylamino)-anthraquinone,
1-(p- or m-aminophenylamino)-4-hydroxyanthraquinone,
1-(p- or m-aminophenylamino)-4-methoxyanthraquinone,
1-(p- or m-aminophenylamino)-4-chloranthraquinone,
1-(p- or m-aminophenylamino)-4-phenylaminoanthraquinone,
1-(p- or m-aminophenylamino)-4-methylaminoanthraquinone,
1-(p- or m-aminophenylamino)-4-acetylaminoanthraquinone,
1-(p- or m-aminophenylamino)-2-bromo-4-hydroxyanthraquinone,
1-(β-aminoethylamino)-4-methylaminoanthraquinone.

These amino compounds are reacted with a halide of an aliphatic monocarboxylic acid, and advantageously with at least one molecular proportion of the monocarboxylic acid for every acylatable amino group.

There are used (a) aliphatic carboxylic acid halides which contain a quaternary ammonium group in the alkyl radical, and advantageously a carboxylic acid halide of the formula (5) 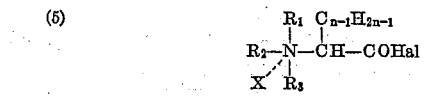

in which $R_1$, $R_2$, $R_3$, X and $n$ have the meanings given above. As examples there may be mentioned betainyl chloride or its self-condensation product of the formulae

or

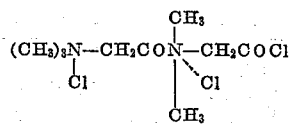

The reaction is advantageously carried out in an inert organic solvent, for example, a hydrocarbon, such as benzene, toluene or xylene; a halogen-hydrocarbon, such as carbon tetrachloride, tetrachlorethane, chlorobenzene, ortho-dichlorobenzene; or nitro-hydrocarbons, such as nitrobenzene or nitro-naphthalene, and advantageously at a raised temperature. When a carboxylic acid halide of the Formula 5 is used the dyestuffs of the invention are obtained in a single stage.

Alternatively there is used (b) a carboxylic acid halide which contains in the alkyl radical, advantageously in α-position, a mobile halogen atom, and preferably a halide of the formula (6) 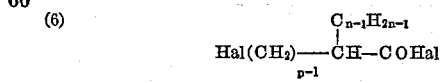

in which $n$ and $p$ have the meanings given above, for example, chloracetyl chloride, bromacetyl bromide, α-chloropropionyl chloride, β-chloropropionyl chloride, α-chlorobutyryl chloride or α-chlorophenyl-acetyl chloride.

There is advantageously used at least one molecular proportion of the chloride for every acylatable amino group. The acylation is carried out under conditions such that only the halogen bound to the carboxylic group is exchanged for the amino group. There is obtained an acylation product which contains a mobile halogen atom, for example, one containing a radical of the formula (7) 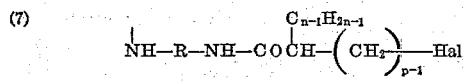

These acylation products may be reacted with a secondary amine, for example, dimethylamine, diethylamine, piperidine or morpholine; or they may be reacted with a tertiary amine, for example, trimethylamine, dimethylethylamine, triethylamine, dimethyl-benzylamine, dimethyl-cyclohexylamine, pyridine or α-picoline, to yield directly the dyestuffs of the invention.

Instead of monoamines, there may be used diamines which contain a tertiary amino group and a primary or secondary amino group, for example, an amine of one of the formulae

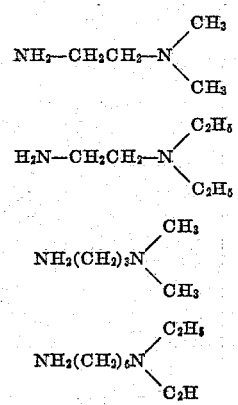

When a compound containing a radical of the Formula 7 is reacted with a primary amine, the compound so obtained must be subsequently treated with an alkylating agent. As examples of suitable alkylating agents there may be mentioned methyl chloride, methyl bromide, methyl iodide, benzyl chloride, dimethylsulfate, diethylsulfate, benzene sulfonic acid methyl ester and paratoluene sulfonic acid ethyl or butyl ester.

The tertiary amines obtained by reacting a compound containing a radical of the Formula 7 with a secondary amine are valuable dyestuffs. In certain cases it may be desirable to quaternate the latter dyestuffs by treatment with an alkylating agent.

The alkylation or the reaction with the amine is advantageously carried out in an inert organic solvent, for example, a hydrocarbon such as benzene, toluene or xylene; a halogen-hydrocarbon such as carbon tetrachloride, tetrachlorethane, chlorobenzene, ortho-dichlorobenzene; or a nitro-hydrocarbon, such as nitro-benzene or nitronaphthalene. Instead of an inert solvent there may be used a large excess of the amine or alkylating agent. In this case care should be taken that the mixture is not overheated, as the reaction is strongly exothermic. Nevertheless, it is necessary in most cases, especially in the presence of an organic solvent, to warm the reaction mixture externally in order to initiate the reaction.

To achieve good yields it is often of advantage to use an excess of the alkylating agent.

When an inert organic solvent is used the dyestuff salt precipitates during the reaction and can be filtered off. Alternatively, the solvent can be removed by distillation, for example in vacuo or with steam.

The dyestuff salts are advantageously purified by dissolution in water, and any unreacted parent dyestuff can be filtered off as an insoluble radical. The dyestuff can be precipitated again from the aqueous solution by addition of a water-soluble salt, such as sodium chloride.

The dyestuffs obtained by the present process contain as anion preferably the radical of a strong acid, for example of sulfuric acid or of a semi-ester thereof, or of an aryl sulfonic acid, or a halogen ion. The afore-mentioned anions introduced into the dyestuff molecule by the present process may also be replaced by anions of other inorganic acids, for example those of phosphoric acid, or of an organic acid such, for example, as formic acid, acetic acid, chloracetic acid, oxalic acid, lactic acid or tartaric acid. In some cases also the free bases can be used. The dyestuff salts may also be used in the form of double salts, for example with halides of an element of the 2nd group of the periodic system, more especially zinc chloride or cadmium chloride.

The dyestuff salts obtained by the present process are suitable for dyeing a wide variety of materials, for example tanned cellulose fibers, silk, hairs, or fully synthetic fibers, more especially polyacrylonitrile, or polymers of asymmetrical dicyanethylene, and they are further suitable for modified polyester fibers containing acid groups. The dyeings obtained on these fibers are distinguished by great fastness to light.

In the following examples parts and percentages are by weight unless otherwise indicated.

*Example 1*

7.7 parts of 1-hydroxy-4-(para-chloracetylamino)-phenylaminoanthraquinone are boiled in 100 parts of pyridine until a test portion dissolves completely in water. The whole is allowed to cool, filtered, and the filter residue is washed with benzene and ligroin. The resulting dyestuff of the formula

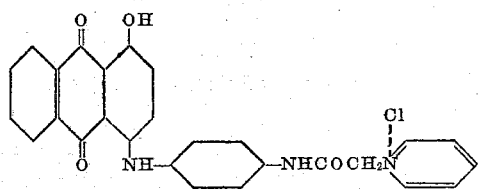

dyes polyacrylonitrile fibers reddish blue tints of outstanding fastness to light.

When α-picoline or dimethyl-cyclohexylamine is used instead of pyridine, a dyestuff of very similar properties is obtained.

1-hydroxy-4-(para - chloracetylamino) - phenylaminoanthraquinone can be prepared by heating 1 molecular proportion of 1-hydroxy-4-(para-aminophenyl)-aminoanthraquinone with 1 molecular proportion of chloracetyl chloride at 60 to 100° C. in chlorobenzene.

*Example 2*

7.7 parts of 1-hydroxy-4-(para-chloracetylamino)-phenylaminoanthraquinone are refluxed for 5 hours with 50 parts of triethylamine and 100 parts of ortho-dichlorobenzene. The mixture is filtered while still warm, washed with warm ortho-dichlorobenzene until it is practically colorless and then with ligroin or petroleum ether. The residue dissolves completely in water. The resulting dyestuff dyes polyacrylonitrile fibers reddish blue tints of outstanding fastness to light.

*Example 3*

10 parts of 1:4-di-(para-chloracetylamino)-phenylaminoanthraquinone—obtained by heating 1 molecular proportion of 1:4-di-(para-aminophenylamino)-anthraquinone with 2 molecular proportions of chloracetylchloride in chlorobenzene at 60 to 100° C.—are boiled in 100 parts of pyridine until a test portion dissolves completely in water. The reaction mixture is allowed to cool, filtered and washed with benzene and ligroin. The resulting dyestuff dyes polyacrylonitrile fibers green tints of outstanding fastness to light.

*Example 4*

7.7 parts of 1-acetylamino-4-(para-chloracetylamino)-phenylaminoanthraquinone are converted by boiling in 100 parts of pyridine as described in Example 1 into a water-soluble blue dyestuff of the formula

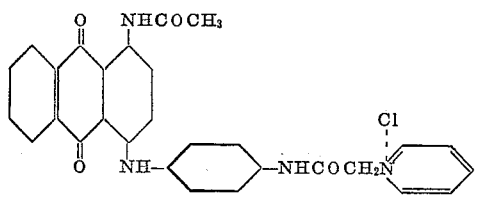

which dyes polyacrylonitrile fibers blue tints of excellent fastness to light.

When, instead, 7.7 parts of 1-acetylamino-4-(meta-chloracetylamino)-phenylaminoanthraquinone are used, a violet dyestuff is obtained which dyes polyacrylonitrile fibers violet tints of excellent fastness to light.

*Example 5*

7.7 parts of 1-hydroxy-(meta-chloracetylamino)-phenyl-aminoanthraquinone are converted by boiling in 100 parts of pyridine as described in Example 1 into a water-soluble, violet-blue dyestuff which dyes polyacrylonitrile fibers violet-blue tints of excellent fastness to light.

*Example 6*

7.7 parts of 1-hydroxy-4-(para-[β-chloropropionyl]-amino)-phenylaminoanthraquinone—obtained by heating 1 molecular proportion of 1-hydroxy-4-(para-aminophenylamino)-anthraquinone with 1 molecular proportion of chloropropionyl chloride in chlorobenzene at 60 to 100° C.—are converted as described in Example 1 into a water-soluble dyestuff of the formula

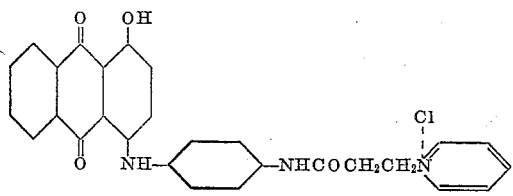

which dyes polyacrylonitrile fibers reddish blue tints of excellent fastness to light.

A dyestuff of very similar properties is obtained from 7.7 parts of 1-hydroxy-4-(para-[α-bromobutyryl]-amino)-phenylaminoanthraquinone.

*Example 7*

6.6 parts of 1-hydroxy-4-(para-amino)-phenylaminoanthraquinone in 30 parts of chlorobenzene and 2.6 parts of dimethylaniline are heated with 6 parts of N-chloro-(N'-chlorobetainyl)-betainyl chloride of the formula

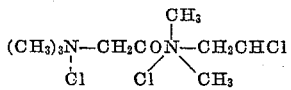

(obtained as described in Example 2 of U.S. Patent 2,359,863 by treating betaine hydrochloride with thionyl chloride) for about 3 hours at 80 to 100° C. until the dyestuff gives a reddish blue solution in water. The dyestuff in aqueous solution has the probable formula

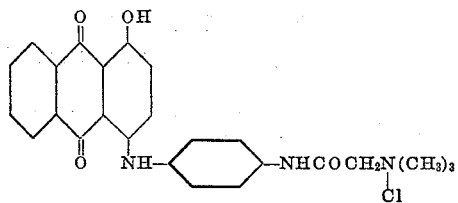

It dyes polyacrylonitrile fibers reddish blue tints of very good fastness to light.

*Example 8*

7.7 parts of 1-(para-chloracetylamino)-phenylamino-anthraquinone are converted as described in Example 1 by boiling in 100 parts of pyridine into a water-soluble, red dyestuff which dyes polyacrylonitrile fibers red tints of excellent fastness to light.

*Example 9*

7.7 parts of 1-dimethylamino-4-(para-chloracetyl-amino)-phenylaminoanthraquinone are converted as described in Example 1 by boiling in 100 parts of pyridine into a water-soluble greenish blue dyestuff which dyes polyacrylonitrile fibers greenish blue tints of excellent fastness to light.

When there is used as starting material 1-amino-2-cyano - 4-(para-chloracetylamino) - phenylaminoanthraquinone (obtained by heating 1-amino-2-cyano-4-(para-aminophenylamino) - anthraquinone with chloracetyl chloride) there is obtained a dyestuff which dyes polyacrylonitrile blue-green tints.

*Example 10*

6 parts of 1-methylamino-4-ethylenediamino-anthraquinone are dissolved in 30 parts of pyridine, treated with 2 parts of chloracetyl chloride in 30 parts of pyridine, stirred for 1 hour at 60° C., and then refluxed for 1 to 2 hours. The pyridine is distilled off in vacuo, and the dyestuff is used as it is or after having been purified by recrystallization. The resulting dyestuff of the formula

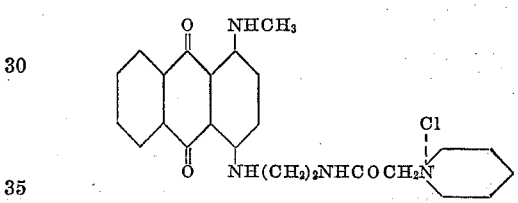

dyes polyacrylonitrile fibers fast blue tints.

When the reaction product with chloracetyl chloride is not heated above 60° C. and separated from the pyridine, reaction with dimethylamine yields a dyestuff of the formula

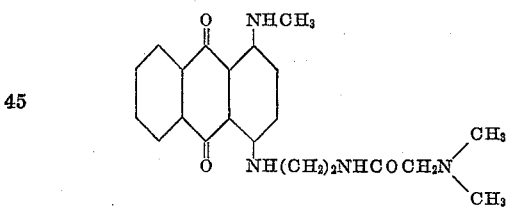

which dyes polyacrylonitrile fibers similar tints.

When the dyestuff obtained as described in the second paragraph above is treated with dimethyl sulfate, a dyestuff results which corresponds to the formula

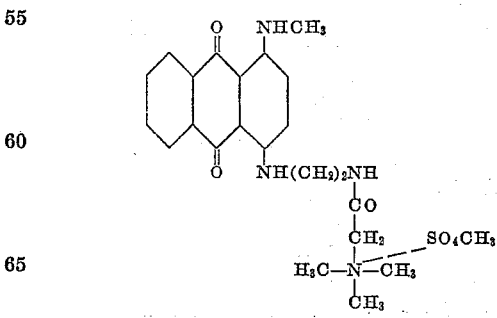

and dyes polyacrylonitrile fibers similar tints.

*Example 11*

A mixture of 8 parts of 1-hydroxy-4-(para-chloracetyl-amino)-phenylaminoanthraquinone and 20 parts of N:N-dimethylamino-propylamine is heated for 15 minutes at 90° C. The dyestuff is precipitated by adding water, suctioned off and washed with water on the filter. The dried filter residue is dissolved in 200 parts of chlorobenzene and at 60° C. treated with 3 parts of dimethyl sulfate, filtered cold, washed with a small amount of chlorobenzene, and the filter residue is dried. The resulting dyestuff of the formula

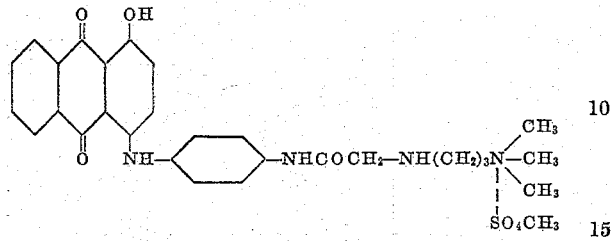

dyes polyacrylonitrile fibers reddish blue tints of excellent fastness to light.

*Example 12*

1 part of the dyestuff salt obtained as described in the first paragraph of Example 1 is dissolved in 500 parts of water with the addition of 5 parts of acetic acid of 40% strength. 100 parts of boiled yarn of polyacrylonitrile staple fibers are immersed in this dyebath, the temperature is raised within 15 minutes to the boil, and the material is boiled for 1 hour. After this time the dyebath is completely exhausted. The dyeing is rinsed and dried. A reddish blue tint of very good fastness to light is obtained.

What is claimed is:

1. An anthraquinone dyestuff of the formula

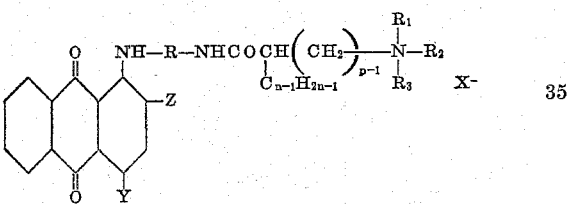

in which R is a member selected from the group consisting of lower alkylene and phenylene;

is a member selected from the group consisting of (a) quaternary amino wherein $R_1$ is lower alkyl and each of $R_2$ and $R_3$ is a member selected from the group consisting of lower alkyl, cyclohexyl and benzyl and (b) a pyridine ring; $n$ is a positive whole number of at most 8; $p$ is a positive whole number of at most 2; X is a water-solubilizing anion; Y is a member selected from the group consisting of hydrogen, halogen, hydroxy, lower alkoxy, lower alkylamino, phenylamino, lower saturated aliphatic acylamino and the group of the formula

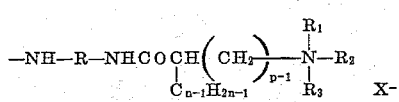

in which each of R,

$n$, $p$ and X is as defined above; and Z is a member selected from the group consisting of hydrogen and cyano.

2. The anthraquinone dyestuff of the formula

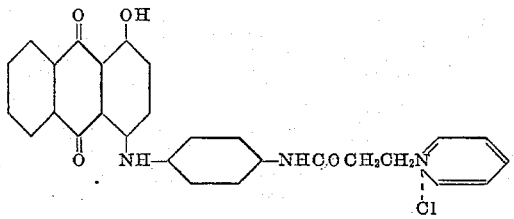

3. The anthraquinone dyestuff of the formula

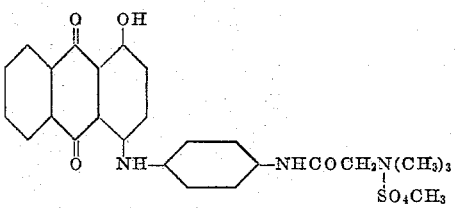

4. The anthraquinone dyestuff of the formula

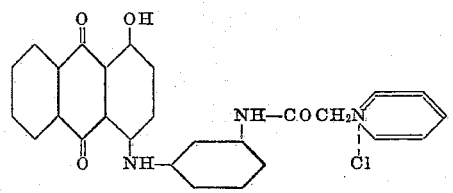

5. The anthraquinone dyestuff of the formula

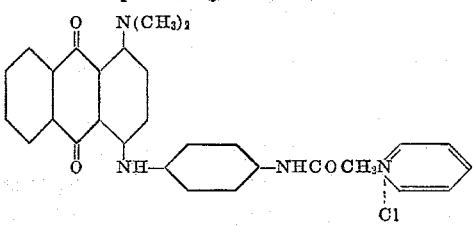

6. A water-soluble anthraquinone dyestuff of the formula

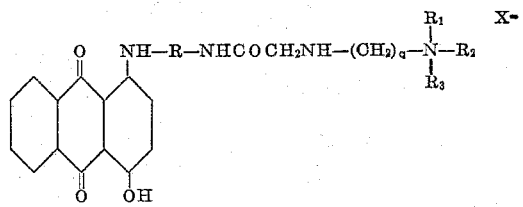

in which R is phenylene, each of $R_1$, $R_2$ and $R_3$ is lower alkyl, $q$ is a whole number from 2 to 8 and X is a water-solubilizing anion.

References Cited in the file of this patent
UNITED STATES PATENTS

| | | |
|---|---|---|
| 2,723,279 | Haefle et al. | Nov. 8, 1955 |
| 2,870,172 | Schoenauer | Jan. 20, 1959 |
| 2,957,010 | Straley et al. | Oct. 18, 1960 |

OTHER REFERENCES

Neblette: Photography, 4th ed., Van Nostrand & Co., page 348 (1943).

Venkataraman: "The Chemistry of Synthetic Dyes," pages 347–348, vol. 1 (1952).